United States Patent [19]
Gribble et al.

[11] 3,941,315
[45] Mar. 2, 1976

[54] PROCESS FOR PRODUCTION OF POWDER PAINTS

[75] Inventors: Peter R. Gribble, Strongsville; Edward V. Denino, North Royalton, both of Ohio

[73] Assignee: SCM Corporation, New York, N.Y.

[22] Filed: Feb. 6, 1974

[21] Appl. No.: 422,691

[52] U.S. Cl. ................................................ 241/3
[51] Int. Cl.² ...................................... B02C 21/00
[58] Field of Search ................................. 241/3.25

[56] References Cited
UNITED STATES PATENTS

| | | | |
|---|---|---|---|
| 2,461,089 | 2/1949 | Smidth | 241/3 |
| 2,548,909 | 4/1951 | Ryden | 241/3 X |
| 2,917,780 | 12/1959 | Petry | 241/3 X |
| 3,643,874 | 2/1972 | Franz et al. | 241/3 |

*Primary Examiner*—Granville Y. Custer, Jr.
*Attorney, Agent, or Firm*—Thomas M. Schmitz

[57] ABSTRACT

In an extrusion process for making powder paints from a series of batch blend units comprising resinous binders and pigmentary solids, interbatch contamination can be suppressed by using a same first portable (hopper) vessel for transporting, temporarily storing, and feeding extruder feed from like particular batch blend units and using a same second portable (hopper) vessel for collecting, transporting, and temporarily storing comminuted extrudates corresponding to said like particular batch blend units and feeding such comminuted extrudates into packages, especially when said first portable vessel is used for part or all of the blending operation. Like extrudates, corresponding to particular batch blend units, can be substantially completely hardened by cooling prior to their comminuting, and collected in, transported to, and temporarily stored for final comminution in a same third portable (hopper) vessel. Alternatively, such particular extrudates can be comminuted before they are substantially completely hardened, then completely hardened subsequently by cooling.

1 Claim, 1 Drawing Figure

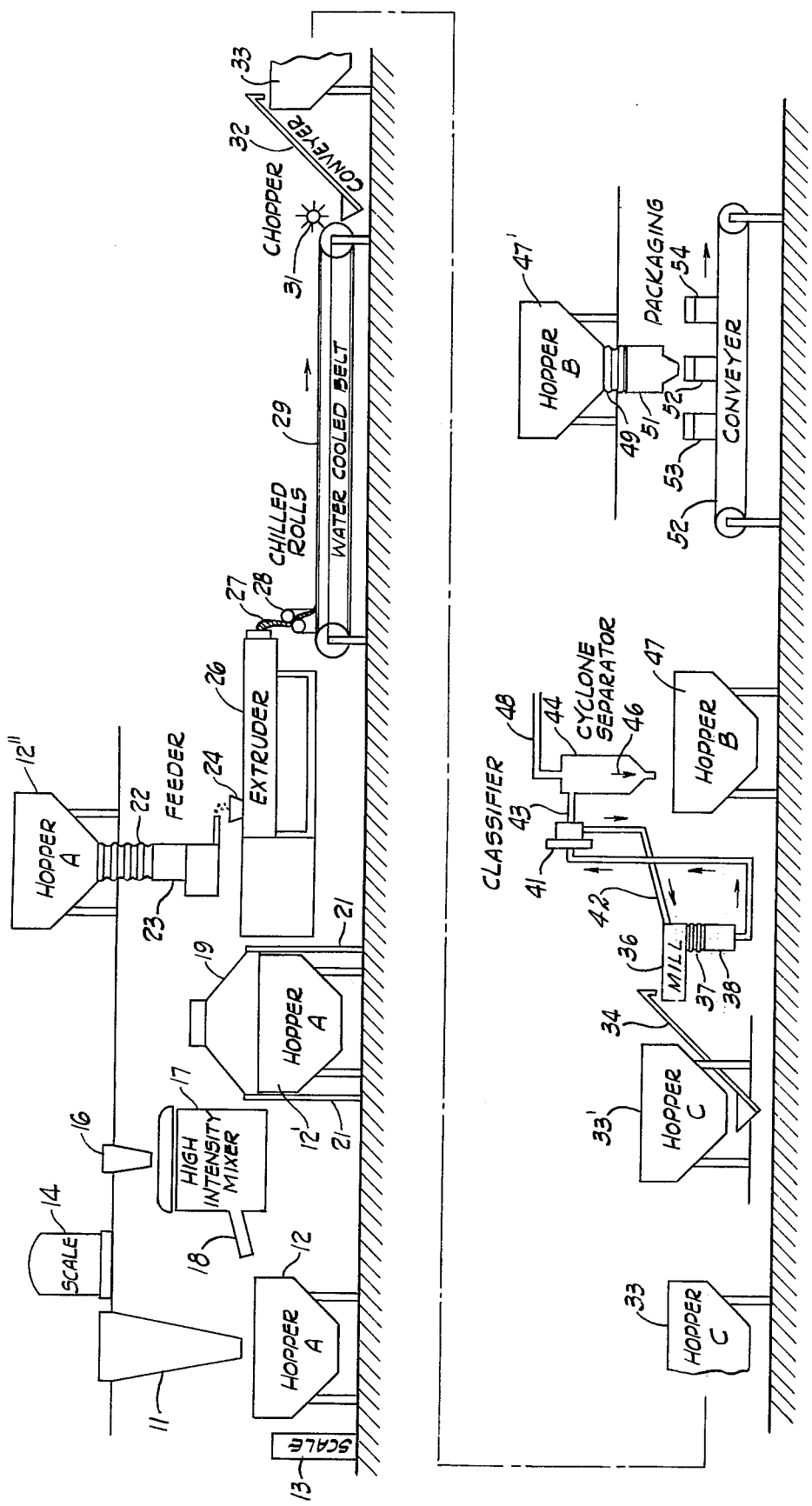

PROCESS FOR PRODUCTION OF POWDER PAINTS

BACKGROUND OF THE INVENTION

This invention relates to an improvement in the manufacture of powder paints, and more particularly in the manufacture of such paints wherein the raw batch ingredients comprising resinous binders and pigmentary solids are plasticized, homogenized, and formed into a coherent extrudate by mechanical extrusion ("hot extrusion process").

Powder paints are ostensibly dry ("hardened") and freeflowing at normal room temperature. They are applied to a substrate by conventional means such as electrostatic spray processes or fluidized bed processes. Because there are little or no fugitive components such as solvents or water in them, they must depend upon their own melting to coalesce, level out, and form a film. The absence in them of the fugitive components, however, is quite attractive in many industrial painting operations because atmospheric contamination from the volatile solvents, etc., is virtually, if not completely, eliminated. Powder paints are applied to hot substrates or those subsequently heated to generate the paint film.

Any single paint plant, including a powder paint plant, generally is expected to produce a wide variety of types and shades of paint in various volumes. Thus, the operators are working on a series of batch units, even though a particular batch unit or like batch units may be run in a continuous or semi-continuous manner for a restricted period of time. One of the biggest problems in making a powder paint is to obtain quite precise uniformity of color (shade) and other properties from batch unit to batch unit.

Accordingly one scheme has been to make the paint up like a traditional solvent-based paint, secure the shading, etc., then remove the solvent as by spray drying or by the process described in U.S. Pat. No. 3,737,401 (wherein the solvent is water soluble, and it is extracted by water from the rest of the paint which is then collected and dried). Thin film evaporation has also been proposed for such removal of solvent from a solvent paint preparatory to its comminution into a powder (generally passing 200 mesh U.S.S. sieve with a minimum of ultrafine material to suppress dusting).

Another process for producing powder paints is by hot extrusion of the raw batch components, which generally contain little or no volatile ingredients whatsoever. Such process is shown in U.S. Pat. No. 3,643,874. For the most part, color matching and adjustment of other critical compositional variables must be accomplished prior to such extrusion. This is especially true where thermosetting resinous vehicles are used in making such powder paints. Subjecting them to reprocessing with additional heat and/or prolonged time tends to advance their crosslinking, and this can result in prematurely hardened particles which are of little or no practical use as coatings. The thermoplastic vehicle powder paints are, of course, less susceptible to damaging from such reprocessing, but, nevertheless, it is expensive and they can become somewhat deteriorated.

A very real problem in the preparation of powder paints by the hot extrusion process is the problem of contamination between unlike batch units. Thus, even traces of acrylic resin-based particles from a previous batch appearing in an epoxy resin-based powder paint often can lead to visible specks or other imperfections which render the epoxy resin-based batch unsatisfactory. Hence, the problem of cleaning and maintaining all equipment in such extrusion process plants to a quite completely clean condition between unlike batch units is extremely critical, not only for such incompatible imperfections, but also for color matching of like batch units and color differentiation between unlike batch units.

SUMMARY OF THE INVENTION

The instant improvement is in a process for making a variety of powder paints in a series of batch units from raw batch ingredients comprising resinous binders and pigmentary solids wherein the raw batch ingredients are plasticized, homogenized, and formed into a coherent extrudate by mechanical extrusion in an extruding step while upstream of said extruding step at least a portion of said raw batch ingredients are intimately blended together as a batch blend unit in a blending step and downstream of said extruding step said extrudate is cooled, comminuted, and packaged in cooling, comminuting, and packaging steps. This improvement helps markedly to suppress interbatch contamination and enhances batch unit uniformity. It comprises:

a. as to a particular batch blend unit: transporting it to, storing it as extrusing step feed in, and feeding it to said extrusing step from a first portable batch unit transporting vessel (hopper) reserved for said particular batch blend unit and like batch blend units; and b. as to the particular comminuted extrudate from said particular batch blend unit: collecting it from said comminuting step, and transporting it to, storing it as packaging step feed in, and feeding it to said packaging step from a second portable batch unit transporting vessel (hopper) reserved for said particular extrudate and like extrudates.

Reservation of a particular portable batch unit transporting vessel (hopper) for a particular batch blend unit or like batch blend units or extrudates therefrom can be done using a plurality of hoppers, with covering of such hoppers during the times such hoppers are being handled or stored. This is particularly effective to suppress interbatch contamination and to secure uniformity of color from like batch to like batch unit. These hopper vessels can be moved by rolling them on the floor or transported by fork lift truck and stored conveniently for use. They act as temporary storage for materials in process. While a single high volume powder paint is being made, particular hoppers can be reserved for that service. When a hopper vessel is thoroughly cleansed, it in effect becomes a "new" vessel for handling components of a new and different batch blend or extrudate. Cleansing is done conventional by air blowing, steaming, scrubbing, solvent or water washing, or the like. The fixed items (referring to the drawing) such as high intensity mixer, the top unit of the hopper-blender, feeder, extruder, chill rolls, belt, chopper, conveyors, mill and its appurtenances, and packager must be scrupulously cleaned when changes are made from one batch composition or formulation to another one unlike the immediately previous one. The skirts can be cleaned or replaced for such changes. Removal and/or disposable liners can be used in the various equipment, if desired, wherein abrasion and impact are low.

DETAILED DESCRIPTION OF THE INVENTION

The drawing is a flow diagram showing the basis of design for a powder paint production line producing about 1200 to 1500 lbs. per hour of powder paints having approximately 40 to 45 lbs. per cubic foot bulk densities. The raw batch ingredients are poured down chute 11 into hopper A (at position 12), a portable hopper of 150 cu. ft. capacity to handle a load of 4000 to 6000 lbs., usually approximately 5000 lbs., of raw batch ingredients. The raw batch ingredients are particulate resinous binder (vehicle), opacifying pigment particles such as rutile $TiO_2$, tinting pigments such as carbon black or a phthalocyanine pigment, and filler and extender pigments such as clay, talc, mica, silica, and the like. The several raw batch ingredients are weighed individually, and the batch in total, by scale 13 on which hopper A rests.

Alternatively, the same ingredients can be weighed on scale 14 and fed through chute 16 into high intensity mixer 17. In such instance the ingredients of batch blend unit is subdivided into subunits, and 5 loads are intensively mixed in mixer 17, and each discharged from outlet 18 into hopper A at position 12 to make a single batch blend unit therein. The high intensity mixer cycle time is about one minute. This mixer typically is a slightly frustroconical (smaller at the top) vessel with an agitator assembly (U.S. Pat. No. 3,337,193) which scoops batch materials from the bottom of the vessel and forces them outwardly and upwardly toward the top of the vessel; the falling particles are guided downwardly through a ring on such agitator assembly, then are forced downwardly for recirculation. Typical of such mixers is the Wellex Inc., 1000 M, 26 cu. ft., 200 horsepower intensive mixer (100 Queens Drive, King of Prussia, Pennsylvania 19406).

Portable hopper A is a Gemco Brand portable hopper. It is moved then to fit under and is sealed to the top of the Gemco Brand hopper-blender unit 19, mounted on trunnions 21. Thus connected, hopper A is shown in position 12'. Near the junction of this hopper-blender top 19 with hopper A is a cantilevered internal agitator unit, not shown, in top 19. Such hopper-blender and all the other hoppers depicted in the drawing are alike and are made by the General Machine Company of New Jersey, 55 Evergreen Avenue, Newark, N.J. 07114, proprietor of the trademark "Gemco." The entire hopper-blender unit in connected, sealed condition is rotated on the trunnions 21 by drive means not shown until an extremely intimate blend of the raw batch blend unit is secured (eg., 10 to 120 minutes). The cantilever internal agitator helps to break up lumps and assist in the blending. Such hopper-blenders of the sort preferred here can be equipped to tolerate reasonable adjustments in balance, internal agitator configuration, and hopper construction to accommodate a fair amount of variation in batch loads.

At the end of the blending operation hopper A is disconnected from unit 19 and raised to position 12 inches above screw feeder 23. The hopper then is connected to such feeder by flexible skirt 22 to preclude dusting and spillage. All the portable hoppers in this design have spherical discharge valves at their conical bottoms. Often it is desirable to feed from hopper A into a conventional tramp metal detector and rejector (not shown) to remove any stray metal items such as nuts, bolts, etc. (which could damage the extruder) before they enter the feeder. These rejecters can operate on the principle of induction, magnetism, and/or physical screening.

Feeder 23 has a three cu. ft. tank, and is equipped with a 4 inch screw connected to a variable speed drive, not shown. The feeder gradually discharges the batch blend unit from hopper A, at position 12", into inlet receiver 24 of screw extruder 26.

The typical screw extruder for this operation is jacketed and the screw internally heated by an indirect heating fluid such as steam, hot water, or a synthetic oil such as Union Carbide Corporation's 50HB280X. One form of extruder that can be used is a Baker-Perkins Company 4 inch "M. P." (trademark) twin screw extruder. Another form is that shown in U.S. Pat. No. 3,643,874, a so-called "Buss-kneader" a trademark of Buss A. G. of Basel, Switzerland. Extruder temperature is regulated according to the type of paint being made, but generally is between about 90°C, and 150°C, at the heated die outlet.

In the extruder the batch blend is plasticized and homogenized, then expelled through a heated die as coherent extrudate 27.

This extrudate passes through internally water-cooled rolls 28, counter-rotating to draw the extrudate forward and flatten it into a ribbon about 1/16 inch thick. Such thin ribbon of plastic extrudate passes on to austenitic stainless steel conveyor belt 29, which is cooled with water sprays playing on the bottom of the belt below the ribbon. The plastic ribbon fully hardens as it is rapidly cooled down to about room temperature (70°-80°F). It passes into chopper 31 at the end of the belt, this breaking the cooled ribbon into small flakes. Chopper unit 31 simply is a counterclockwise rotating spined shaft with the spines passing downwardly between fixed projecting fingers that support the cooled frangible ribbon as it comes off the belt at the discharge end return bend.

The flakes are dropped into the bottom of inclined screw conveyer 32 and are conveyed thereby to portable hopper C (at position 33), of the same type as portable hopper A.

Portable hopper C is raised to position 33' and unloaded into inclined screw conveyer 34 to feed a hammer mill 36 at a rate of about 1200 to 1500 lbs. per hour. Mill 36 is fed with liquid nitrogen to remove heat of grinding and to maintain the ground product essentially isothermally at about room temperature (and above the dew point of the surrounding atmosphere). This prevents moisture from condensing on the resulting powder paint. The same temperature restriction is observed in the water cooling of the extrudate to prevent atmospheric moisture condensation on such extrudate. The powder paint product is ground so that the preponderance of it passes a 200 mesh (U.S.S.) seive. The powder passes through skirt 37 into receiver 38, then upwardly into classifier 41. This is a vertical screen unit; it is equipped with a fan on its discharge side which sucks the powder paint of appropriate fineness (−200 mesh) through such screen and passes it through discharge 43 into cyclone separator 44. Herein it falls downwardly (as shown by particles indicated as item 46) into portable hopper B (at position 47). Oversized particles rejected by the screen are returned to mill 36 for remilling through line 42. Waste gas and extremely fine particles pass out of cyclone separator 44 through line 48; the fines in such flow are collected by a bag dust collector (not shown), and the gas passes to atmosphere. While these fines can be recovered for use, they are in extremely small proportion relative to the batch blend unit, and they generally are discharged from the system as waste so as not to contaminate the products.

Hopper B is elevated to position 47' and is discharged through skirt 49 into automatic packaging unit 51 (typically a 50 lb. Bemis Packaging Service weighing sacker). Such sacker weighs out automatically 50 lb. increments of the powder paint to an accuracy of 1 oz., and the finished powder paint is discharged into cardboard boxes lined with a plastic liner such as a polyethylene liner. Such boxes are shown moving from left to right on conveyer 56 as unfilled box 53, box being filled 52, and filled box 54. The filled boxes are sealed, stacked by means not shown, and stored (preferably above the dew point and at a temperature not in excess of 75°–80°F to suppress gellation of thermosetting resinous or clumping of thermoplastic resinous powder paints).

In place of the water cooled belt and flaker, the arrangement shown in U.S. Pat. No. 3,643,874 can be used wherein the cooled flakes of paint are directly fed to the final comminuting operation. When malleable solids such as aluminum flakes are to be blended in the batch blend unit, it is often useful not to feed them into the feed end of the extruder (item 24) where they can be subjected to high shear in the entire extruder operation, but rather to fold them gently into the extrudate emerging from the hot die at the discharge end. This can be done by adding a further screw extrusion unit, not shown, to the normal discharge of primary extruder 26, which further unit has much less severe shearing action on the entire mass. Such further unit can be in-line with the discharge end of extruder 26, or can actually be a so-called "cross-head extruder" maintaining a second screw or multiple of screws perpendicular to the flow output of primary extruder 26.

The finished, ground product in hopper B can be further mixed with flow agents, metallic pigments, or other pigment additives by connecting hopper B at position 12' to the hopper-blender top unit 19 and rotatively blending as necessary or desirable to give a dry blend for the ultimate finishing. When the powder paint is made with a thermosetting resin, it is usually undesirable or impractical to recycle once-extruded extrudate or powder back through further heated or heat-generating extrusion operations. However, when the powder paint vehicle is simply a thermoplastic resin, such recycling can be practiced more freely. The use of the portable hoppers permits temporary intermediate collection and storage at various stages of the operation, and these hoppers can be covered, e.g., with rigid plastic covers, to prevent tramp contamination.

In place of using an air-cooled or water-cooled belt for chilling the extrudate and rendering it frangible, one can, of course, use other coolants such as liquid nitrogen to cool the extrudate and harden it in the manner of freezing of foods. Direct water cooling on the extrudate generally is not practiced (to preclude leaching of water solubles from the extrudate), but can be practiced with a certain water-resistant powder paint formulations. Certain powder paints such as some thermoplastic vinyl resinous powder paints advantageously are comminuted by cryogenic grinding (ground very cold by treatment with liquid nitrogen or the like to embrittle them); they should be protected from condensation of atmospheric moisture until they warm up to above the dew point.

Where the extrudate can tolerate high enough temperature, heating to render it fairly fluid (as distinguished from a putty-like mass), it is, of course, possible to subdivide such extrudate, as with a spinning disc-type atomizer or the like, then finish the cooling and hardening by dropping the particles through a chilling tower (ordinarily countercurrent to chilled dry air) for collection directly as powder paint.

Curiously, in the instance of this hot extrusion powder paint process, we have found that substantially lower proportions of pigments are used to obtain a given color or tinted finish than when the paint is compounded conventionally as corresponding solvent-based paint system.

Useful pigments include pigmentary-size opacifying agents such as rutile or anatase titania, lithopone, titanium calcium, zinc oxide and mixtures of same, extenders and fillers (herein included under the broad term "pigments") such as kaolinite clay, pigmentary silica, talc, mica, Wollastonite, calcium carbonate and barium sulfate also can be used. Many other pigmentary materials and extenders also can be used. Other pigmentary materials often are used to impart color, for example, brown, red, yellow and black iron oxides, raw sienna and burnt sienna, raw and burnt umber, chromium oxide green, phthalocyanine green (chlorinated copper phthalonitrile), the green iron salt of nitroso beta naphthol, copper phthalonitrile blue, ultramarine blue, carbon black, lamp black, toluidine red, parachlor red, para toner (red), alkali resistant red, BON red and maroon, cadmium reds and yellows, Watchung red, madder lake (red), Duratone red, carmine red, chrome yellow (lead chromate), chrome orange, and Hansa yellows (which are azo couplings of meta nitroparatoluidine and acetoacetanilide). Metal flakes, powders and pastes (preferably conventionally treated and coated) also can be used, and these preferably are handled specially in the instant extrusion process as described above. Latent curing accelerators, catalysts, and cross-linking agents also can be compounded in such powder paints.

Various classes of thermosetting resins for this compounding include: epoxy types (which are extruded at an extruder discharge head temperature, for example, of 90°–100°C—a typical powder paint being ⅓ by weight of such pigmentary solids and ⅔ by weight of such granular cross-linkable epoxy resin such as Dow Chemical Company's DER663U, a bisphenol A epoxy resin having epoxy equivalent weight of 730–840, mixed with 5% of a cross linker, of dicyandiamide or trimellitic anhydride); cross-linkable acrylic resin particles such as Farben Fabriken Bayer's L2269 acrylate-based copolymer resin having softening range of 90°–100°C, and made up similarly in pigment and resin ratio with a melamine resin cross linker such as hexamethylol melamine resin; and polyesters such as terephthalic acid/propylene glycol/glycerine polyesters having Acid No. between 6 and 10, which generally is extruded at a head temperature of approximately 127°C, using similar weight proportion of pigmentation, and a cross linking material such as 10 to 15% of a melamine resin, such as hexamethylol melamine resin, basis weight of polyester. While higher or lower temperatures can be used, it must be understood that substantially lower temperatures without special plasticizing agents tends to make it difficult to homogenize and form a coherent extrudate of the powder paint batch, and substantially higher temperatures (e.g. over 175°C) tend to engender cross linking, as do long holding times of any thermosetting resin batch material at any elevated temperatures above about 30° or 40°C.

A convenient test of thermosetting powder paints to determine their utility for application is a gel time test. In such test, a few grams of the powder paint are put on a metal dish, which is placed on a hot plate maintained at 176.67°C. The warm paint is touched with a metal spatula and strings are drawn from such paint until the stringing stops. The longer the time such paint continues to string, the less advanced the cross linking is in the powder paint and generally, the more useful it is for powder painting processes. Such gel time of 30 to 200 seconds generally is looked for in practical powder painting operations.

Various thermoplastic vinyl polymers also are useful for making powder paints, for example Union Carbide Corporation's E2000, a white, powdery vinyl chloride/-modified copolymer. Typically these are extruded at about 90°–100°C, then subjected to cryogenic grinding preparatory to their packaging.

We claim:

1. In a process for making powder paints from raw batch ingredients of resinous binder intimately blended with pigmentary solids within a batch blend unit wherein the blend is plasticized and homogenized to form a uniform blend, the uniform blend being extruded by mechanical extrusion, cooled, comminuted into powder paint, and packaged, the improvement which comprises:

providing a plurality of portable batch blend vessels for avoiding contamination between successive batches to collect said uniform blend and to collect said extrudate wherein a first portable batch blend vessel collects the uniform blend of raw batch ingredients from the batch blend unit and a second portable batch blend vessel collects the comminuted powder from the extruder;

moving the first portable batch blend vessel from said batch blend unit to the extruder for feeding the uniform blend of raw batch ingredients to the extruder; and moving the second portable batch blend vessel containing comminuated powder from the extruder and transporting the powder paint to the packaging step for packaging.

* * * * *